United States Patent
Yoo et al.

(10) Patent No.: US 12,423,018 B2
(45) Date of Patent: Sep. 23, 2025

(54) STORAGE DEVICE AND OPERATING METHOD OF STORAGE DEVICE

(71) Applicant: SAMSUNG ELECTRONICS CO., LTD., Suwon-si (KR)

(72) Inventors: Kwangho Yoo, Seoul (KR); Hoyou Jun, Suwon-si (KR); Jaejoon Choi, Suwon-si (KR); Hong-Mook Choi, Bucheon-si (KR); Juhyung Hong, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 941 days.

(21) Appl. No.: 17/451,214

(22) Filed: Oct. 18, 2021

(65) Prior Publication Data

US 2022/0283731 A1 Sep. 8, 2022

(30) Foreign Application Priority Data

Mar. 4, 2021 (KR) .................. 10-2021-0028649

(51) Int. Cl.
*G06F 12/14* (2006.01)
*G06F 3/06* (2006.01)
*G06F 21/79* (2013.01)
*H04L 9/06* (2006.01)

(52) U.S. Cl.
CPC .......... *G06F 3/0655* (2013.01); *G06F 3/0622* (2013.01); *G06F 3/0679* (2013.01); *G06F 12/1408* (2013.01); *G06F 21/79* (2013.01); *H04L 9/0637* (2013.01)

(58) Field of Classification Search
CPC .... G06F 12/1408; G06F 21/79; G06F 3/0655; G06F 3/0622; G06F 3/0679; H04L 9/0637
See application file for complete search history.

(56) References Cited

U.S. PATENT DOCUMENTS

| | | | |
|---|---|---|---|
| 8,078,858 B2 | 12/2011 | Herzi et al. | |
| 8,666,064 B2 | 3/2014 | Choi et al. | |
| 9,165,164 B2 | 10/2015 | Manabe | |
| 9,614,667 B2 | 4/2017 | Yamada | |
| 2007/0064946 A1 | 3/2007 | Ohkubo et al. | |
| 2008/0130875 A1* | 6/2008 | Ahlquist | H04L 9/0662 380/29 |
| 2011/0123020 A1* | 5/2011 | Choi | H04L 9/0637 380/28 |
| 2011/0311048 A1 | 12/2011 | Nagata et al. | |
| 2019/0349186 A1* | 11/2019 | Lapworth | H04L 9/0637 |

FOREIGN PATENT DOCUMENTS

JP 4912797 4/2012

* cited by examiner

*Primary Examiner* — Matthew T Henning
(74) *Attorney, Agent, or Firm* — Morgan, Lewis & Bockius LLP

(57) ABSTRACT

Storage devices are provided which include a nonvolatile memory device and a memory controller controlling the nonvolatile memory device. The memory controller includes a plurality of encryption and decryption cores, the plurality of encryption and decryption cores perform initialization at the same time and generate a plurality of initial tweak values, sequentially select the plurality of initial tweak values to perform encryption or decryption, and perform the encryption or the decryption in parallel by using one or more initial tweak values selected from the plurality of initial tweak values.

20 Claims, 12 Drawing Sheets

STORAGE DEVICE AND OPERATING METHOD OF STORAGE DEVICE

CROSS-REFERENCE TO RELATED APPLICATIONS

This application claims priority under 35 U.S.C. § 119 to Korean Patent Application No. 10-2021-0028649 filed on Mar. 4, 2021, in the Korean Intellectual Property Office, the disclosures of which are incorporated by reference herein in their entireties.

BACKGROUND

Embodiments of the present disclosure described herein relate to an electronic device, and more particularly, relate to a storage device performing encryption or decryption with an improved speed and an operating method of the storage device.

A storage device is a computing component used to store and read information both permanently and temporarily. In some cases, storage devices utilize encryption methods to preserve privacy and information security. For example, the process of encryption takes plain text and translates it into seemingly meaningless symbols. This renders the plain text significantly more secure as an outside viewer cannot decipher the text. Decryption then reverses the process, taking the seemingly meaningless symbols and converting them back to plain text.

In some cases, a solid-state drive storage device performs encryption in the process of writing user data and performs decryption in the process of reading user data for the security of the user's data. Because the user data is stored in a nonvolatile memory device in the storage device in an encrypted state, the security of the user data may be more secure.

However, as the write speed and read speed of nonvolatile memory devices are improved, the encryption or decryption can hinder the operating speed of the storage device, effectively becoming a bottleneck. Accordingly, there is a need in the art for improving the encryption or decryption speed of the storage device to maintain a high write speed and a read speed of the memory device.

SUMMARY

Embodiments of the present disclosure provide a storage device performing encryption or decryption with an improved speed and an operating method of the storage device.

According to an embodiment, a storage device includes a memory device, and a memory controller configured to control the memory device. The memory controller includes a plurality of encryption and decryption cores, the plurality of encryption and decryption cores perform initialization in parallel and generate a plurality of initial tweak values, respectively, the plurality of encryption and decryption cores sequentially select the plurality of initial tweak values to perform encryption or decryption, and the plurality of encryption and decryption cores perform the encryption or the decryption using an initial tweak value selected from the plurality of initial tweak values.

According to an embodiment, an operating method of a storage device which includes a memory device and a plurality of encryption cores includes receiving a write request, an address, and write data, initializing the plurality of encryption cores to generate a plurality of initial tweak values, sequentially selecting the plurality of initial tweak values and encrypting the write data by using the plurality of encryption cores, and transmitting the encrypted write data to the memory device.

According to an embodiment, an operating method of a storage device which includes a memory device and a plurality of decryption cores includes receiving a read request and an address, initializing the plurality of decryption cores to generate a plurality of initial tweak values, dividing read data read from the memory device into sectors based on logical block addresses, and sequentially selecting the plurality of initial tweak values and decrypting each of the sectors by using the plurality of decryption cores.

BRIEF DESCRIPTION OF THE FIGURES

The above and other objects and features of the present disclosure will become apparent by describing in detail embodiments thereof with reference to the accompanying drawings.

DETAILED DESCRIPTION

The present disclosure relates generally to an electronic device. More particularly, the disclosure relates to a storage device configured to perform encryption and decryption and an operating method of the storage device. Some embodiments of the present disclosure improve the performance of a memory device by applying tweak values to encryption and decryption operations of the memory device. As a result, less processing power is used to encrypt and decrypt information.

Encryption and decryption operations can be processor-intensive, taking needed performance away from the operation of the memory device. As a result, the speeds of memory devices, such as flash memory, can decrease as more encryption and decryption is used for security.

In some embodiments, the storage device of the present disclosure includes a memory device and a memory controller controlling the nonvolatile memory device. The memory device can be a nonvolatile memory device. The memory controller includes a plurality of encryption and decryption cores, the plurality of encryption and decryption cores perform initialization at the same time (i.e., in parallel) and generate a plurality of initial tweak values, respectively, sequentially select the plurality of initial tweak values to perform encryption or decryption, and perform the encryption or the decryption together by using an initial tweak value selected from the plurality of initial tweak values.

Embodiments of the present disclosure may be described in detail and clearly to such an extent that one skilled in the art easily may carry out the present disclosure.

Figure 1:
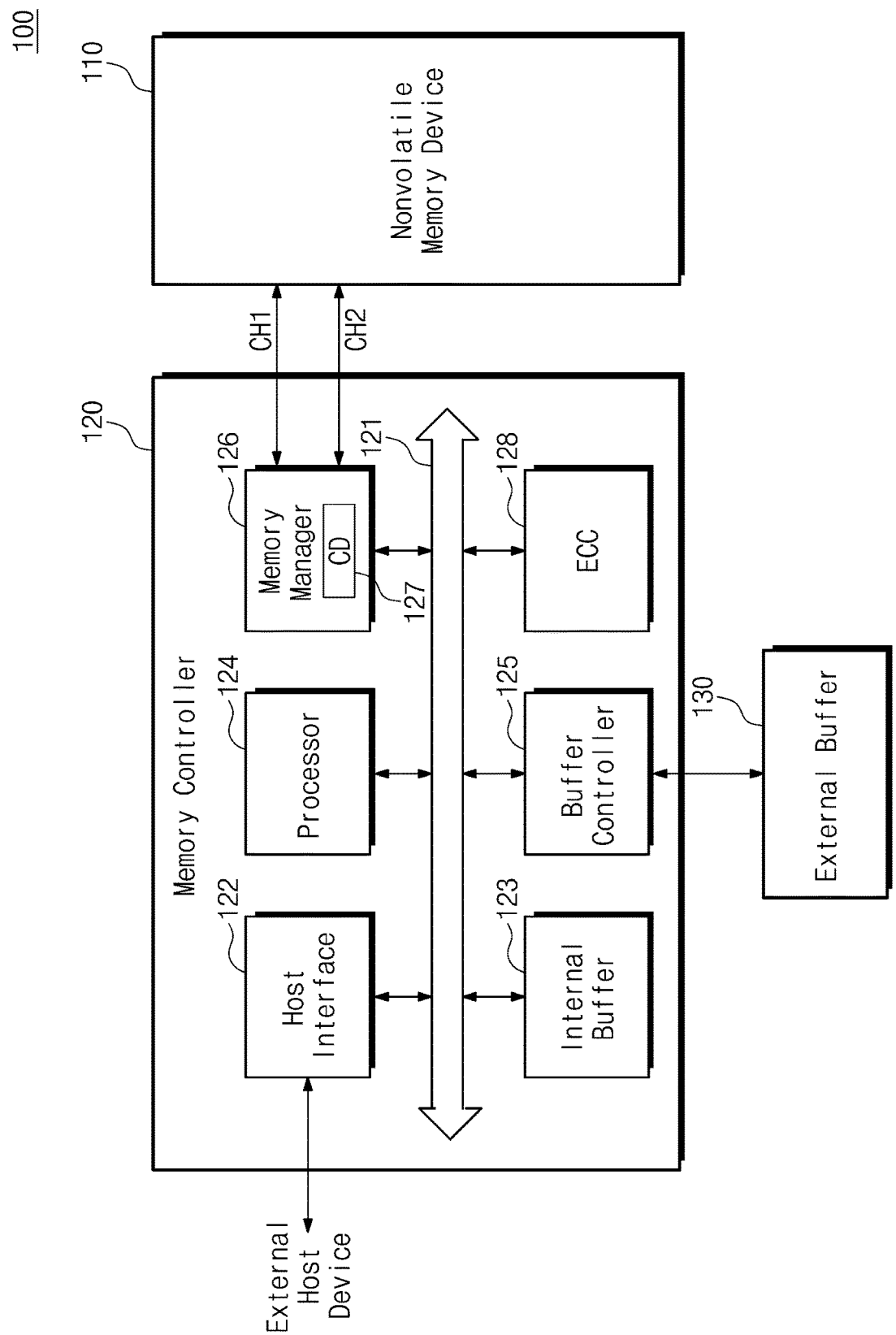
FIG. 1 illustrates a storage device according to an embodiment of the present disclosure.

FIG. 1 illustrates a storage device 100 according to an embodiment of the present disclosure. Referring to FIG. 1, the storage device 100 may include a nonvolatile memory device 110, a memory controller 120, and an external buffer 130. The nonvolatile memory device 110 may include a plurality of memory cells. Each of the plurality of memory cells may store two or more bits.

For example, the nonvolatile memory device 110 may include at least one of various nonvolatile memory devices such as a flash memory device, a phase change memory device, a ferroelectric memory device, a magnetic memory device, and a resistive memory device.

The memory controller 120 may receive various requests for writing data in the nonvolatile memory device 110 or reading data from the nonvolatile memory device 110 from an external host device. The memory controller 120 may store (or buffer) user data communicated with the external host device to the external buffer 130. Additionally, the memory controller 120 may store metadata for managing the storage device 100 to the external buffer 130.

The memory controller 120 may access the nonvolatile memory device 110 through a first channel CH1 and a second channel CH2. For example, the memory controller 120 may transmit a command and an address to the nonvolatile memory device 110 through the first channel CH1. The memory controller 120 may exchange data with the nonvolatile memory device 110 through the first channel CH1.

The memory controller 120 may transmit a first control signal to the nonvolatile memory device 110 through the second channel CH2. The memory controller 120 may receive a second control signal from the nonvolatile memory device 110 through the second channel CH2.

In an embodiment, the memory controller 120 may be configured to control two or more nonvolatile memory devices. The memory controller 120 may be connected with two or more nonvolatile memory devices through first channels different from each other and second channels different from each other.

For another example, the memory controller 120 may be connected with two or more nonvolatile memory devices through one first channel, for example, a shared channel. The memory controller 120 may be connected with two or more nonvolatile memory devices through a portion of the second channel CH2 as a shared portion and may separately provide the remaining portion thereof.

The external buffer 130 may include a random access memory. For example, the external buffer 130 may include at least one of a dynamic random access memory, a phase change random access memory, a ferroelectric random access memory, a magnetic random access memory, or a resistive random access memory.

The memory controller 120 may include a bus 121, a host interface 122, an internal buffer 123, a processor 124, a buffer controller 125, a memory manager 126, and an error correction code block 128.

The bus 121 may provide communication channels between components in the memory controller 120. The host interface 122 may receive various requests from the external host device and may parse the received requests. The host interface 122 may store the parsed requests in the internal buffer 123.

The host interface 122 may transmit various responses to the external host device. The host interface 122 may exchange signals with the external host device in compliance with a given communication protocol. The internal buffer 123 may include a random access memory. For example, the internal buffer 123 may include a static random access memory or a dynamic random access memory.

The processor 124 may drive an operating system or firmware for driving the memory controller 120. The processor 124 may read the parsed requests stored in the internal buffer 123 and may generate commands and addresses for controlling the nonvolatile memory device 110. The processor 124 may provide the generated commands and addresses to the memory manager 126.

The processor 124 may store various metadata for managing the storage device 100 in the internal buffer 123. The processor 124 may access the external buffer 130 through the buffer controller 125. The processor 124 may control the buffer controller 125 and the memory manager 126 such that user data stored in the external buffer 130 are transmitted to the nonvolatile memory device 110.

The processor 124 may control the host interface 122 and the buffer controller 125 such that the data stored in the external buffer 130 is transmitted to the external host device. The processor 124 may control the buffer controller 125 and the memory manager 126 such that data received from the nonvolatile memory device 110 is stored in the external buffer 130. The processor 124 may control the host interface 122 and the buffer controller 125 such that data received from the external host device is stored in the external buffer 130.

Under control of processor 124, the buffer controller 125 may write data in the external buffer 130 or may read data from the external buffer 130. The memory manager 126 may communicate with the nonvolatile memory device 110 through the first channel CH1 and the second channel CH2 under control of the processor 124.

The memory manager 126 may access the nonvolatile memory device 110 under control of the processor 124. For example, the memory manager 126 may access the nonvolatile memory device 110 through the first channel CH1 and the second channel CH2. The memory manager 126 may communicate with the nonvolatile memory device 110, based on a protocol that may be defined in compliance with the standard or is defined by a manufacturer.

The memory manager 126 may include an encryption and decryption unit (CD) 127. The encryption and decryption unit 127 may perform encryption on data to be transmitted to the nonvolatile memory device 110 by the memory manager 126. The encryption and decryption unit 127 may perform decryption on data read from the nonvolatile memory device 110 by the memory manager 126. In an embodiment, the encryption and decryption unit 127 may perform encryption or decryption based on an advanced encryption standard (AES).

The encryption and decryption unit 127, according to an embodiment of the present disclosure, may increase the speed (hereinafter referred to as an "encryption or decryption speed") in which encryption or decryption is performed. Accordingly, writing data in the nonvolatile memory device 110 may be prevented from being delayed due to a time used to perform encryption. Also, reading data from the nonvolatile memory device 110 may be prevented from being delayed due to a time used to perform decryption. Accordingly, the operating speed of the storage device 100 may be improved.

The error correction code block 128 may perform error correction encoding on data to be transmitted to the nonvolatile memory device 110 by using an error correction code ECC. The error correction code block 128 may perform error correction decoding on data received from the nonvolatile memory device 110 by using the error correction code ECC.

Locations and relationships of the memory manager 126, the encryption and decryption unit 127, and the error correction code block 128 are only an example and may be variously changed or modified.

For example, the error correction code block 128 may also be included in the memory manager 126. The memory manager 126 may encrypt data by using the encryption and decryption unit 127, may perform error correction encoding on the encrypted data by using the error correction code block 128, and may transmit the error correction encoded data to the nonvolatile memory device 110. The memory manager 126 may also perform error correction decoding on data transmitted from the nonvolatile memory device 110 by using the error correction code block 128. Additionally, the memory manager 126 may perform decryption on the error correction decoded data by using the encryption and decryption unit 127.

For example, the error correction code block 128 may also be included in the memory manager 126. The memory manager 126 may perform error correction encoding on data by using the error correction code block 128, may encrypt the error correction encoded data by using the encryption and decryption unit 127, and may transmit the encrypted data to the nonvolatile memory device 110. The memory manager 126 may also perform decryption on data transmitted from the nonvolatile memory device 110 by using the encryption and decryption unit 127. Additionally, the memory manager 126 may perform error correction decoding on the decrypted data by using the error correction code block 128.

For example, the encryption and decryption unit 127 may be placed outside the memory manager 126 and may be correlated with the buffer controller 125 or the host interface 122. The encryption and decryption unit 127 may perform encryption on data that may be received from the external host device and are then to be provided to the external buffer 130. The encrypted data stored in the external buffer 130 may be error correction encoded by the error correction code block 128. The encrypted data may be transmitted to the nonvolatile memory device 110 through the memory manager 126. Data transmitted from the nonvolatile memory device 110 may be error correction decoded by the error correction code block 128. The error correction decoded data may be stored in the external buffer 130. The encryption and decryption unit 127 may perform decryption on data to be transmitted from the external buffer 130 to the external host device.

For example, the encryption and decryption unit 127 may be placed outside the memory manager 126 and may be correlated with the buffer controller 125. The encryption and decryption unit 127 may perform encryption on data read from the external buffer 130. The encrypted data may be error correction encoded by the error correction code block 128 so as to be transmitted to the nonvolatile memory device 110 through the memory manager 126. Data transmitted from the nonvolatile memory device 110 may be error correction decoded by the error correction code block 128. The encryption and decryption unit 127 may perform decryption on the error correction decoded data to be stored in the external buffer 130.

In an embodiment, the storage device 100 may not include the external buffer 130 and the buffer controller 125. When the external buffer 130 and the buffer controller 125 are not included in the storage device 100, the above functions of the external buffer 130 and the buffer controller 125 may be performed by the internal buffer 123.

Figure 2:
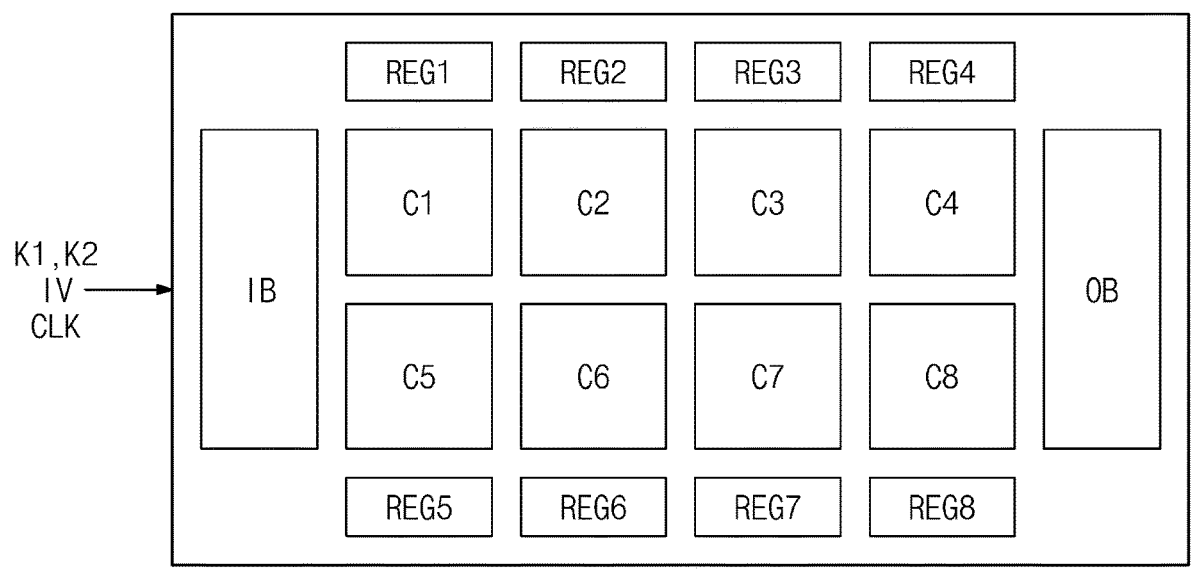
FIG. 2 illustrates an example of an encryption and decryption unit.

FIG. 2 illustrates an example of the encryption and decryption unit 127. Referring to FIGS. 1 and 2, the encryption and decryption unit 127 may receive a first key K1, a second key K2, an initial vector IV, and a clock signal CLK from the outside.

The first key K1 may be received from the processor 124 or may be received from a hardware block configured to generate the first key K1. For example, the first key K1 may include a tweak key. The first key K1 may be used to generate a key that may be used to perform encryption and decryption.

The second key K2 may be received from the processor 124 or may be received from a hardware block configured to generate the second key K2. For example, the second key K2 may be a key that may be used for encryption or decryption.

The initial vector IV may be used to generate a value that may be used to perform encryption and decryption. For example, the initial vector IV may include a value associated with data targeted for encryption or decryption. For example, the initial vector IV may include an address (e.g., a logical address or a physical address) indicating data targeted for encryption or decryption, a key (e.g., a key based on key-value store), or a hash value.

The clock signal CLK may be received from the processor 124. The clock signal CLK may also be received from a clock generator included within the memory controller 120. Additionally, the clock signal CLK may be received from a delay locked loop (DLL) or a phase locked loop (PLL) included within the memory controller 120 and configured to output the clock signal CLK based on a clock signal received from the external host device.

The encryption and decryption unit 127 may include an input buffer IB, an output buffer OB, first to eighth encryption and decryption cores C1 to C8, and first to eighth registers REG1 to REG8. Herein the term "encryption and decryption core" may refer to an electronic circuit configured to perform encryption, decryption, or both encryption and decryption.

The input buffer IB may temporarily store input data targeted for encryption or decryption. Data provided to the encryption and decryption unit 127 for encryption or decryption may be stored in the input buffer IB. The output buffer OB may temporarily store output data being an encryption or decryption result. The data stored in the output buffer OB may be output to the outside of the encryption and decryption unit 127.

The first to eighth encryption and decryption cores C1 to C8 may perform encryption or decryption on data stored in the input buffer IB. The first to eighth encryption and decryption coes C1 to C8 may sequentially start encryption or decryption such that encryption or decryption operations are performed in parallel. The first to eighth registers REG1 to REG8 may respectively store values generated by the first to eighth encryption and decryption cores C1 to C8.

In an embodiment, the number of encryption and decryption cores and the number of registers are illustrated in detail. However, the number of encryption and decryption cores and the number of registers, which are illustrated in FIG. 2, are only an example and may be changed and modified.

Figure 3:
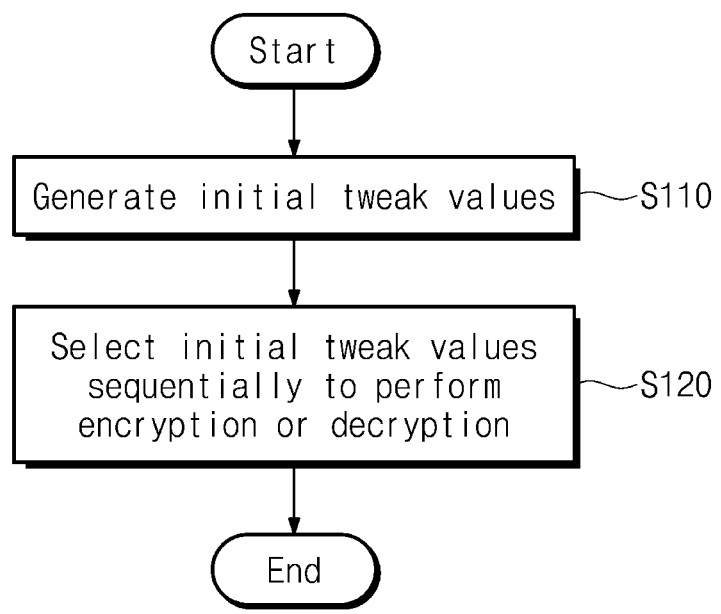
FIG. 3 illustrates an example of an operating method of an encryption and decryption unit.

FIG. 3 illustrates an example of an operating method of the encryption and decryption unit 127. Referring to FIGS. 1, 2, and 3, in operation S110, the first to eighth encryption and decryption coes C1 to C8 of the encryption and decryption unit 127 may generate initial tweak values. For example, the first to eighth encryption and decryption cores C1 to C8 may perform initialization operations based on the first key K1 and the initial vector IV and may thus generate the initial tweak values. The initial tweak values thus generated may be respectively stored in the first to eighth registers REG1 to REG8.

A tweak is an additional input to an encryption process distinct from the primary (e.g., plaintext or ciphertext) input to be encrypted. A tweak can identify a permutation computed by the cipher. Since changing the tweak can be computationally efficient, encryption can be improved or made more efficient. For example, tweak values can start from an arbitrary integer and can be assigned consecutively.

In operation S120, the first to eighth encryption and decryption coes C1 to C8 may sequentially select the generated initial tweak values to perform encryption or decryption. For example, the first to eighth encryption and decryption cores C1 to C8 may select one of the generated initial tweak values and may perform encryption or decryption based on the selected initial tweak value, the second key K2, and input data. As a result, the first to eighth encryption and decryption coes C1 to C8 may select another of the generated initial tweak values to perform encryption or decryption.

Figure 4:
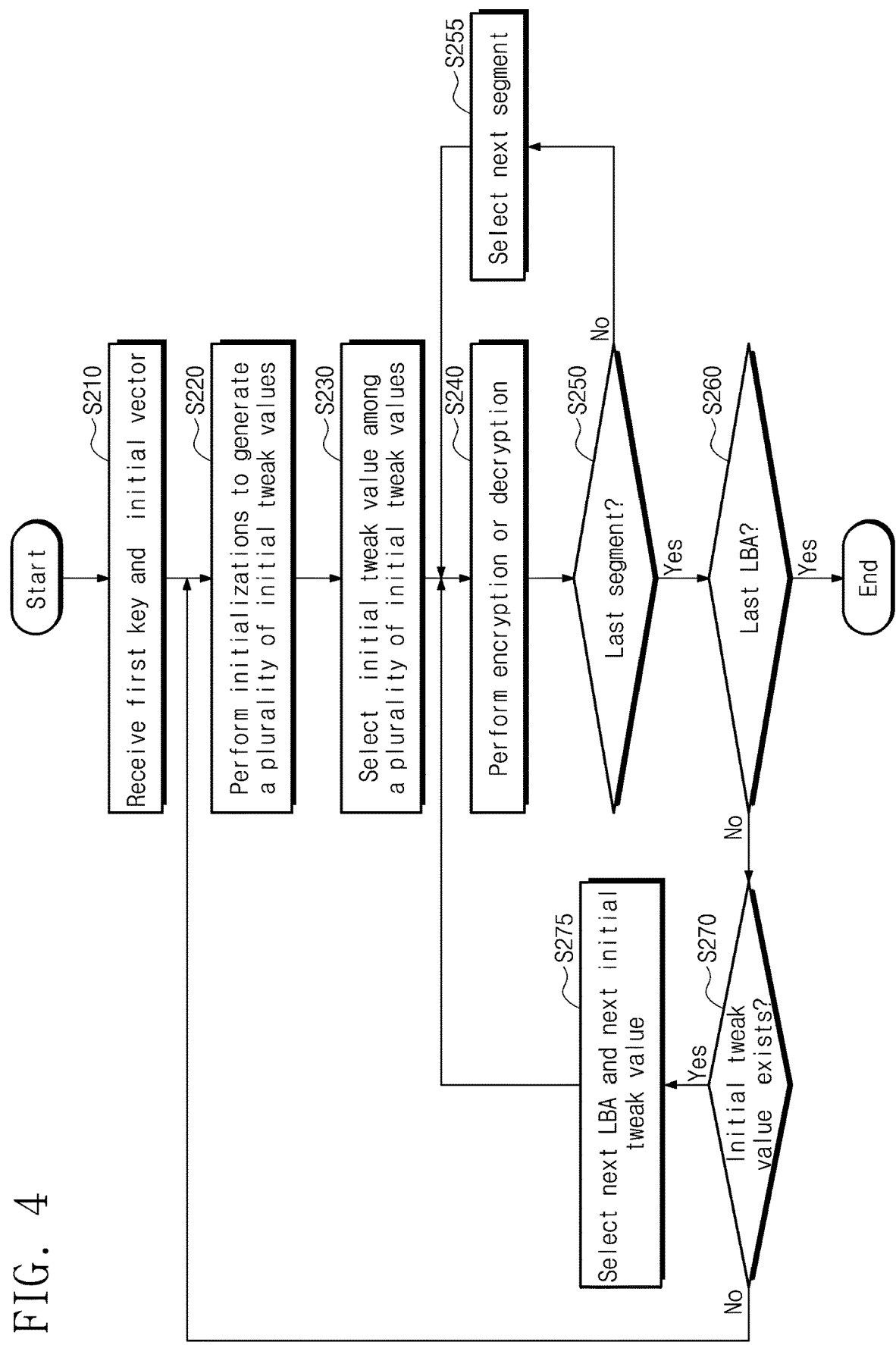
FIG. 4 illustrates an example of an operating method of an encryption and decryption unit in more detail.

FIG. 4 illustrates an example of an operating method of the encryption and decryption unit 127 in more detail. Referring to FIGS. 1, 2, 3, and 4, in operation S210, the first to eighth encryption and decryption coes C1 to C8 may receive the first key K1 and the initial vector IV.

In an embodiment, the first to eighth encryption and decryption coes C1 to C8 may receive the same initial vector IV or different initial vectors IV. In an embodiment, the first to eighth encryption and decryption coes C1 to C8 may receive the same first key K1 or different first keys K1.

In operation S220, the first to eighth encryption and decryption coes C1 to C8 may perform initialization operations to generate a plurality of initial tweak values. For example, the first to eighth encryption and decryption cores C1 to C8 may perform initialization operations based on the first key K1 and the initial vector IV and may thus generate the plurality of initial tweak values, respectively. The plurality of initial tweak values thus generated may be respectively stored in the first to eighth registers REG1 to REG8. The plurality of initial tweak values thus generated may be different. Operation 5210 and operation S220 may correspond to operation S110 of FIG. 3.

In operation S230, the first to eighth encryption and decryption coes C1 to C8 may select one initial tweak value of the plurality of initial tweak values. For example, the first encryption and decryption core C1 may select one of the first to eighth registers REG1 to REG8 and may read the initial tweak value stored in the selected register.

In operation S240, the first to eighth encryption and decryption coes C1 to C8 may perform encryption or decryption based on the selected initial tweak value, the second key K2, and input data. The first to eighth encryption and decryption coes C1 to C8 may sequentially start encryption or decryption. The first to eighth encryption and decryption cores C1 to C8 may perform the sequentially started encryption or decryption operations in parallel.

The first to eighth encryption and decryption cores C1 to C8 may divide data input through the input buffer IB by a unit of a logical block address LBA. Data corresponding to the logical block address LBA may be called a "sector". The first to eighth encryption and decryption coes C1 to C8 may perform encryption or decryption on data of one logical block address LBA by using the selected initial tweak value. For example, the first to eighth encryption and decryption coes C1 to C8 may divide data of one logical block address LBA into segments and may perform encryption or decryption for each segment.

In operation S250, in response to that encryption or decryption of a previous segment is completed, each of the first to eighth encryption and decryption cores C1 to C8 may determine whether encryption or decryption of the last segment is completed. When it is determined that the encryption or decryption of the last segment is not completed, each of the first to eighth encryption and decryption cores C1 to C8 may select a next segment in operation S255 and may perform encryption or decryption on the selected segment in operation S240.

When it is determined in operation S250 that the encryption or decryption of the last segment is completed, the encryption or decryption of the data of the logical block address LBA may be completed. In operation S260, the first to eighth encryption and decryption coes C1 to C8 may determine whether there is completed encryption or decryption of data corresponding to the last logical block address LBA of the encryption or decryption-targeted data.

When it is determined that the encryption or decryption of the data corresponding to the last logical block address LBA is not completed, in operation S270, the first to eighth encryption and decryption coes C1 to C8 may determine whether at least one initial tweak value of the plurality of initial tweak values exists, for example, whether at least one initial tweak value that is not used is present.

When it is determined that at least one initial tweak value that is not used is present, in operation S275, the first to eighth encryption and decryption coes C1 to C8 may select a next initial tweak value of the plurality of initial tweak values stored in the first to eighth registers REG1 to REG8. For example, the first encryption and decryption core C1 may select a next register from the first to eighth registers REG1 to REG8 based on a given order and may read the initial tweak value from the selected register. Afterwards, in operation S240 to operation S260, the first to eighth encryption and decryption cores C1 to C8 may perform encryption or decryption on data corresponding to a next logical block address LBA of the encryption or decryption-targeted data.

In an embodiment, when some or all of the initial tweak values are used or when an unused initial tweak value does not exist, the first to eighth encryption and decryption cores C1 to C8 may perform the initialization operations in operation S220 and may again generate a plurality of initial tweak values. The plurality of initial tweak values thus generated may be different. The plurality of initial tweak values thus generated may be different from the plurality of initial tweak values previously generated. Afterwards, the first to eighth encryption and decryption cores C1 to C8 may select one initial tweak value in operation S230 and may perform encryption or decryption on data of the next logical block address LBA in operation S240 to operation S260.

When it is determined in operation S260 that encryption or decryption of data of the last logical block address LBA is completed, the first to eighth encryption and decryption coes C1 to C8 may terminate encryption or decryption.

Figure 5:
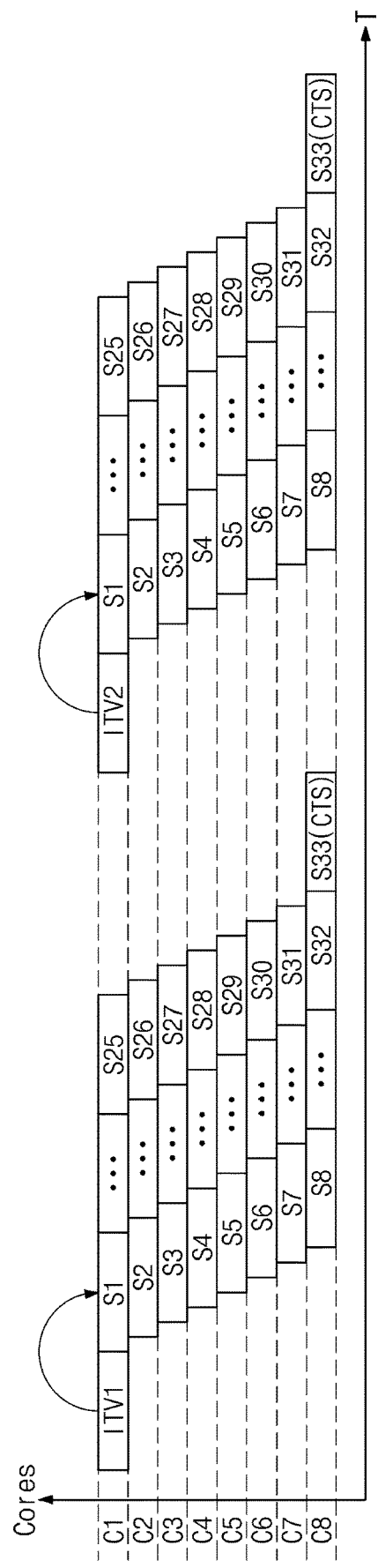
FIG. 5 illustrates an example of a process where an encryption and decryption unit performs encryption or decryption in a normal mode.

FIG. 5 illustrates an example of a process where the encryption and decryption unit 127 performs encryption or decryption in a normal mode. Referring to FIG. 5, at least one encryption and decryption core (e.g., including the first encryption and decryption core C1) may generate a first initial tweak value ITV1. Afterwards, the first to eighth encryption and decryption cores C1 to C8 may sequentially start encryption or decryption of first to eighth segments Si to S8, based on the first initial tweak value ITV1.

After the encryption or decryption starts, encryption or decryption operations of the first to eighth segments S1 to S8 may be performed in parallel (or simultaneously) by the first to eighth encryption and decryption coes C1 to C8.

In one example, the first encryption and decryption core C1 performs encryption or decryption by using the first initial tweak value ITV1. After C1 performs the encryption or decryption, each of the first to eighth encryption and decryption coes C1 to C8 may perform encryption or decryption by revising an initial tweak value immediately previously used to perform the encryption or decryption.

For example, each of the first to eighth encryption and decryption coes C1 to C8 may revise an immediately previously used initial tweak value by using a constant. Each of the first to eighth encryption and decryption cores C1 to C8 may revise an immediately previously used initial tweak value by applying at least one of various operations, such as addition, subtraction, multiplication, division, or modulo, to the immediately previously used initial tweak value by using a constant.

In response to that encryption or decryption of one segment is completed, each of the first to eighth encryption and decryption cores C1 to C8 may perform encryption or decryption of a next segment. In an embodiment, 25th to 32nd segments S25 to S32 may be encrypted or decrypted by the first to eighth encryption and decryption cores C1 to C8, respectively.

After the encryption or decryption of the 32nd segment S32 is terminated, cypher text stealing CTS may occur. CTS is a method of using a block cipher mode that allows for processing of text that is not evenly divisible into blocks, without expansion of the ciphertext. In one example, processing of all but the last two blocks is unchanged, but a part of the penultimate block's ciphertext is used to pad the last block. In some cases, CTS can be performed with only slightly increased complexity.

For example, after the encryption or decryption of the 32nd segment S32 is performed, the amount of the remaining data of the 32nd segment S32 may be smaller than the amount of one segment. Because encryption or decryption is performed in units of segment, encryption or decryption cannot be performed on the remaining data.

The cypher text stealing CTS may support encryption or decryption of the remaining data without an overhead that unnecessary data are written. For example, data that correspond to data of one segment minus the remaining data may be stolen from the encrypted 32nd segment S32.

For example, the amount of data included in one segment may be "n" (n being a positive integer) (e.g., n bits or n bytes). In the encryption or decryption-targeted data, the remaining data after encryption or decryption is performed on the 32nd segment S32 may be "k" (k being a positive integer) (e.g., k bits or k bytes).

The eighth encryption and decryption core C8 may generate a 33rd segment S33 (e.g., capable of being called "combination data") by getting (n-k) data from the encrypted 32nd segment S32 and combining the (n-k) data and the k data being the remaining data. The eighth encryption and decryption core C8 may output encrypted or decrypted data of "k" as a result of encryption or decryption of the encrypted 32nd segment S32.

The eighth encryption and decryption core C8 may perform encryption or decryption on the 33rd segment S33. The eighth encryption and decryption core C8 may output encrypted data of "n" as a result of encrypting the 33rd segment S33. In the terms of getting and again encrypting previously encrypted data, encryption of the remaining data may be called "cypher text stealing CTS".

Decryption may be performed the same as that described with reference to FIG. 5, except that a decryption order of the 32nd segment S32 and the 33rd segment S33 is changed. Thus, additional descriptions will be omitted to avoid redundancy.

As illustrated in FIG. 5, when the cypher text stealing CTS is performed, encryption of the 32nd segment S32 and encryption of the 33rd segment S33 are sequentially performed by the eighth encryption and decryption core C8. Because the continuity of an encryption sequence of the first to eighth encryption and decryption coes C1 to C8 is not maintained, the continuity of revision of an initial tweak value is not maintained. Accordingly, a new initial tweak value should be used for encryption of data of a next logical block address LBA.

At least one encryption and decryption core including the first encryption and decryption core C1 may perform initialization to generate a second initial tweak value ITV2. Afterwards, encryption may be performed on the data of the next logical block address LBA by using the second initial tweak value ITV2.

Initialization for generating an initial tweak value may act as a delay factor in an encryption or decryption process. For example, when the initialization is repeatedly performed by the cypher text stealing CTS, an encryption or decryption speed may be reduced.

A size of a segment may be defined in the process of designing the encryption and decryption unit 127. A size of data of a logical block address LBA may change depending on a specification of a manufacturer intending to adopt the encryption and decryption unit 127. The cypher text stealing CTS may be used as a primary solution for compensating for a difference between a design of the encryption and decryption unit 127 and a specification of a manufacturer. For example, a decrease in an encryption or decryption speed due to the cypher text stealing CTS may frequently occur in the storage device 100.

Figure 6:
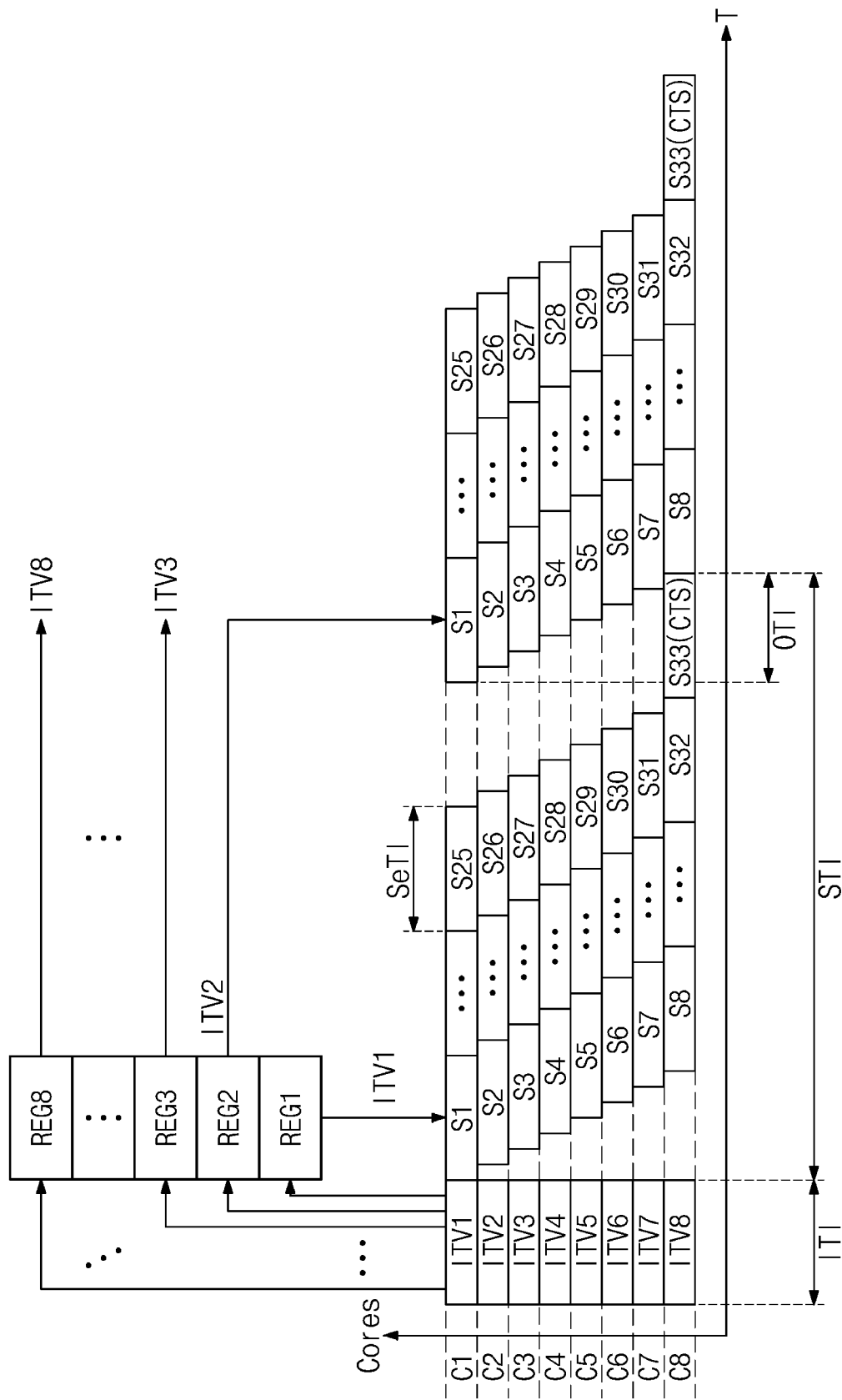
FIG. 6 illustrates a process in which an encryption and decryption unit according to an embodiment of the present disclosure performs encryption or decryption in a high-speed mode, based on an operating method of FIG. 4.

FIG. 6 illustrates a process in which the encryption and decryption unit 127, according to an embodiment of the present disclosure, performs encryption or decryption in a high-speed mode, based on the operating method of FIG. 4. Referring to FIGS. 1, 2, and 6, in an initialization time interval ITI, the first to eighth encryption and decryption coes C1 to C8 may respectively perform initialization operations to generate first to eighth initial tweak values ITV1 to ITV8. The first to eighth initial tweak values ITV1 to ITV8 may be respectively stored in the first to eighth registers REG1 to REG8.

After the initialization time interval ITI, the first to eighth encryption and decryption coes C1 to C8 may perform a sector time interval STI, based on one initial tweak value of the first to eighth initial tweak values ITV1 to ITV8, for example, the first initial tweak value ITV1 stored in the first register REG1. During the sector time interval STI, the first to eighth encryption and decryption cores C1 to C8 may perform encryption or decryption on data (e.g., a sector) of one logical block address LBA by using the first initial tweak value ITV1.

The encryption of the data of the logical block address LBA may be performed the same as that described with reference to FIG. 5. The first to eighth encryption and decryption coes C1 to C8 may sequentially start encryption on the first to eighth segments S1 to S8. Each of the first to eighth encryption and decryption coes C1 to C8 may perform encryption, based on a result of revising an initial tweak value immediately previously used for encryption.

After the first to eighth encryption and decryption coes C1 to C8 perform encryption on 25th to 32nd segments S25 to S32, the eighth encryption and decryption core C8 may perform encryption on a 33rd segment S33 based on the cypher text stealing CTS.

After the first encryption and decryption core C1 completes encryption of the last segment, on which the first encryption and decryption core C1 performs encryption, from among segments of the data of the first logical block address LBA, For example, completes encryption of the 25th segment S25, the first encryption and decryption core C1 may wait for a given time. For example, the given time may be a time taken for each of the first to eighth encryption and decryption coes C1 to C8 to encrypt one segment, for example, a segment time interval SeTI.

After the given time elapses, the first to eighth encryption and decryption coes C1 to C8 may perform the sector time interval STI, based on another initial tweak value of the first to eighth initial tweak values ITV1 to ITV8, for example, the second initial tweak value ITV2 stored in the second register REG2. For example, the first encryption and decryption core C1 may perform encryption on a first segment Si of data (e.g., a sector) of a second logical block address LBA by using the second initial tweak value ITV2.

Following the first encryption and decryption core C1, the second to eighth encryption and decryption cores C2 to C8 may sequentially start encryption on second to eighth segments S2 to S8 of the data of the second logical block address LBA. Because the first encryption and decryption core C1 completes encryption of a 25th segment S25 of the data of the first logical block address LBA and then waits for the segment time interval SeTI, the eighth encryption and decryption core C8 may start encryption of an eighth segment S8 of the data of the second logical block address LBA after the segment time interval SeTI elapses from when encryption of the 32nd segment S32 of the first logical block address LBA is completed.

In an embodiment, during the segment time interval SeTI between the encryption of the 32nd segment S32 of the data of the first logical block address LBA and the encryption of the eighth segment S8 of the data of the second logical block address LBA, the eighth encryption and decryption core C8 may perform encryption of the 33rd segment S33 based on the cypher text stealing CTS.

After the encryption of the data of the second logical block address LBA is completed, encryption of data of a third logical block address LBA may be performed based on the third initial tweak value ITV3. Compared to the encryption method of FIG. 5, in the high-speed mode, the encryption and decryption unit 127 may not repeatedly have the initialization time interval ITI. Accordingly, a speed at which the encryption and decryption unit 127 performs encryption or decryption may be improved, and an encryption or decryption time may be shortened.

Decryption may be performed the same as that described with reference to FIG. 6, except that a decryption order of the 32nd segment S32 and the 33rd segment S33 is changed. Thus, additional description will be omitted to avoid redundancy.

As illustrated in FIG. 6, the first to eighth encryption and decryption cores C1 to C8 may have an overlap time interval OTI in which a segment of the data of the first logical block address LBA and a segment of the data of the second logical block address LBA are encrypted or decrypted in parallel. A difference between a time when the encrypted 33rd segment S33 of the data of the first logical block address LBA is output and a time when the encrypted first segment Si of the data of the second logical block address LBA is output may be shorter than the segment time interval SeTI.

In an embodiment, in response to reading an initial tweak value from a selected register, the first to eighth encryption and decryption cores C1 to C8 may initialize the corresponding register. Accordingly, the security of the encryption and decryption unit 127 may be improved.

An embodiment is described as each of the first to eighth encryption and decryption cores C1 to C8 generates an initial tweak value in the initialization time interval ITI. However, at least two encryption and decryption cores of the first to eighth encryption and decryption coes C1 to C8 may be correlated such that the at least two encryption and decryption cores generate one initial tweak value during the initialization time interval ITI.

Figure 7:
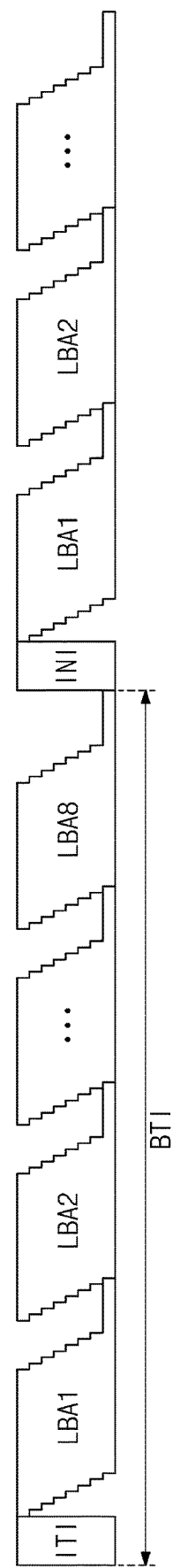
FIG. 7 illustrates an example where an encryption and decryption unit performs encryption or decryption on a plurality of sectors.

FIG. 7 illustrates an example where the encryption and decryption unit 127 performs encryption or decryption on a plurality of sectors. Referring to FIGS. 1, 2, and 7, in an initialization time interval ITI, the first to eighth encryption and decryption coes C1 to C8 may generate 8 initial tweak values ITV1 to ITV8. Afterwards, the first to eighth encryption and decryption coes C1 to C8 may continuously perform encryption or decryption of first to eighth logical block addresses LBA1 to LBA8 without initialization by using the 8 initial tweak values ITV1 to ITV8.

When some or all the 8 initial tweak values ITV1 to ITV8 are used, the first to eighth encryption and decryption coes C1 to C8 may again generate 8 initial tweak values in the initialization time interval ITI. Afterwards, the first to eighth encryption and decryption coes C1 to C8 may continuously perform encryption or decryption of 8 logical block addresses without initialization by using the 8 initial tweak values.

In an embodiment, the storage device 100 may exchange data with the external host device in units of data block. When one data block includes data of 8 logical block addresses, the first to eighth encryption and decryption coes C1 to C8 may perform encryption or decryption on one data block through one initialization time interval ITI. For example, encryption or decryption may be performed in an on-the-fly manner. A time interval where a data block is encrypted or decrypted may be a block time interval BTI.

When one block includes data of 16 logical block addresses, one data block may be encrypted or decrypted through two initialization time intervals. In an embodiment, a size of data included in a data block and a size of data of a logical block address may be set such that encryption or decryption is performed in an on-the-fly manner.

In an embodiment, one segment may include 16-byte data. Data of one logical block address may include 520-byte data. One data block may include data of 4 kilobytes or more. A data block may be called the following name depending on a kind of an operating system: a cluster or a chunk.

Figure 8:
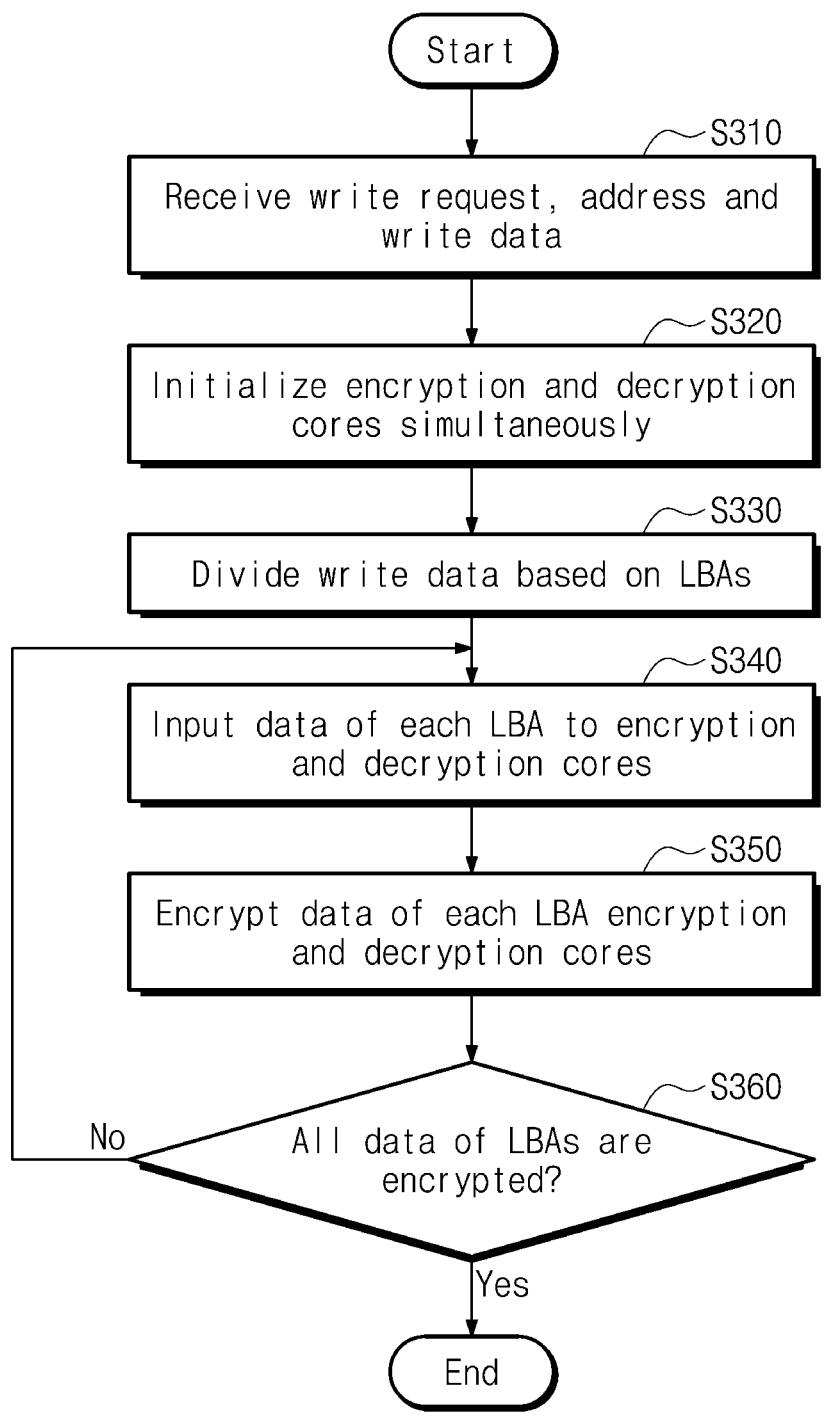
FIG. 8 illustrates an example of a process in which a storage device performs encryption.

FIG. 8 illustrates an example of a process in which the storage device 100 performs encryption. In an embodiment, FIG. 8 shows an example in which one data block is encrypted, in a configuration where the first to eighth encryption and decryption coes C1 to C8 performs encryption or decryption on sectors of one data block through one initialization. Referring to FIGS. 1, 2, and 8, in operation S310, the storage device 100 may receive a write request, an address, and write data from the external host device.

In operation S320, the encryption and decryption unit 127 of the storage device 100 may generate a plurality of initial tweak values by simultaneously initializing the first to eighth encryption and decryption cores C1 to C8 and may store the generated initial tweak values in the first to eighth registers REG1 to REG8.

In operation S330, the encryption and decryption unit 127 may divide the write data received through the input buffer IB, based on a logical block address LBA. In operation S340, the encryption and decryption unit 127 may input pieces of data of logical block addresses LBA to the first to eighth encryption and decryption cores C1 to C8, respectively. In operation S350, the first to eighth encryption and decryption coes C1 to C8 may encrypt the pieces of data of the logical block addresses LBA, respectively.

In operation S360, the encryption and decryption unit 127 may determine whether encryption of the data of logical block addresses received through the input buffer IB is completed. Operation S340 and operation S350 may be repeated until encryption of the data of logical block addresses belonging to one data block is terminated. When the encryption of the data of the logical block addresses belonging to one data block is terminated, encryption is terminated.

The encrypted data block may be transmitted to the nonvolatile memory device 110 in units of data block, in units of logical block address LBA, or the like. The nonvolatile memory device 110 may write the transmitted data in memory cells.

Figure 9:
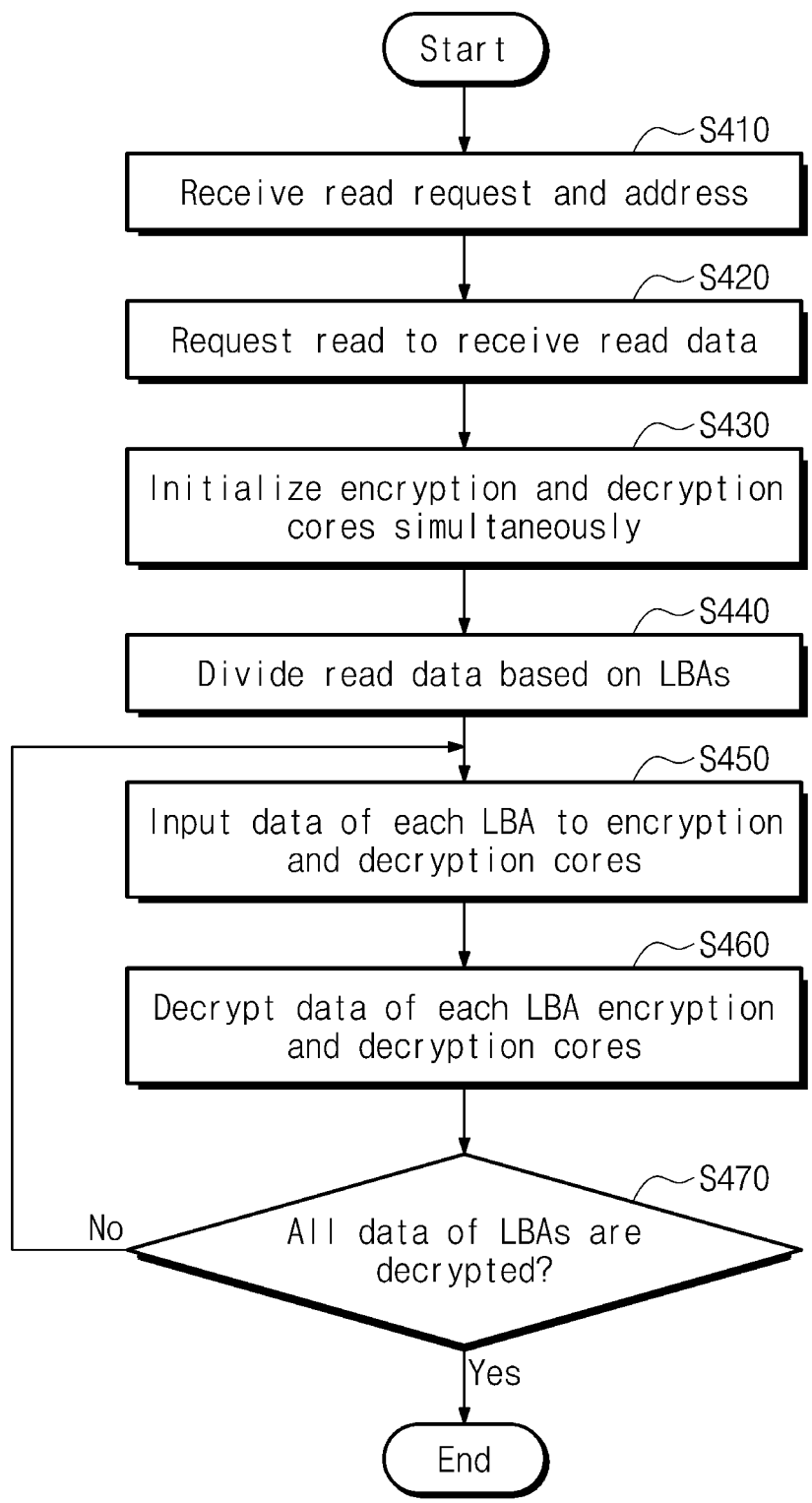
FIG. 9 illustrates an example of a process in which a storage device performs decryption.

FIG. 9 illustrates an example of a process in which the storage device 100 performs decryption. In an embodiment, FIG. 9 shows an example in which one data block is decrypted, in a configuration where the first to eighth encryption and decryption coes C1 to C8 performs encryption or decryption on sectors of one data block through one initialization. Referring to FIGS. 1, 2, and 9, in step S410, the storage device 100 may receive a read request from the external host device.

In operation S420, the memory controller 120 may request the nonvolatile memory device 110 for a read operation and may receive read data. In operation S430, the encryption and decryption unit 127 of the storage device 100 may generate a plurality of initial tweak values by simultaneously initializing the first to eighth encryption and decryption cores C1 to C8 and may store the generated initial tweak values in the first to eighth registers REG1 to REG8.

In operation S440, the encryption and decryption unit 127 may divide the write data received through the input buffer IB, based on a logical block address LBA. In operation S450, the encryption and decryption unit 127 may input pieces of data of logical block addresses LBA to the first to eighth encryption and decryption cores C1 to C8, respectively. In operation S460, the first to eighth encryption and decryption coes C1 to C8 may decrypt the pieces of data of the logical block addresses LBA, respectively.

In operation S470, the encryption and decryption unit 127 may determine whether decryption of the data of logical block addresses received through the input buffer IB is completed. Operation S450 and operation S460 may be repeated until decryption of the data of logical block addresses belonging to one data block is terminated. When the decryption of the data of the logical block addresses belonging to one data block is terminated, decryption is terminated.

The encrypted data block may be transmitted from the nonvolatile memory device 110 in units of data block, in units of logical block address LBA, or the like.

Figure 10:
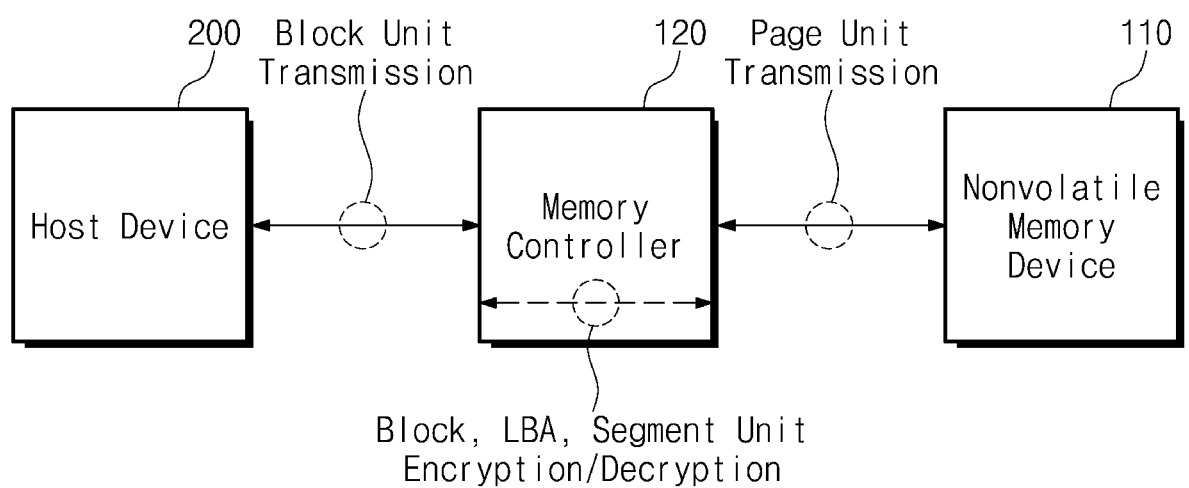
FIG. 10 illustrates an example of communication between a nonvolatile memory device, a memory controller, and a host device.

FIG. 10 illustrates an example of communication between the nonvolatile memory device 110, the memory controller 120, and a host device 200. Referring to FIGS. 1 and 10, the host device 200 may exchange data with the memory controller 120 in units of data block.

As described with reference to FIGS. 6 and 7, the memory controller 120 may perform encryption or decryption in units of data block, logical block address LBA, and segment. In an embodiment, the memory controller 120 may control encryption and decryption cores such that the encryption and decryption cores perform initializations in units of data block.

The memory controller 120 may control the encryption and decryption cores such that the cypher text stealing CTS is performed in units of logical block address LBA and a next key of a plurality of keys is selected. The memory controller 120 may control the encryption and decryption cores such that encryption or decryption is performed in units of segment.

The memory controller 120 may exchange data with the nonvolatile memory device 110 in units of page. A size of a page may be determined by a physical structure of the nonvolatile memory device 110. For example, a size of data of one page may correspond to a size of data of a plurality of segments, a plurality of logical block addresses, or a plurality of data blocks. For example, a size of data of one data block, one logical block address LBA, or one segment may correspond to a size of data of two or more pages.

Figure 11:
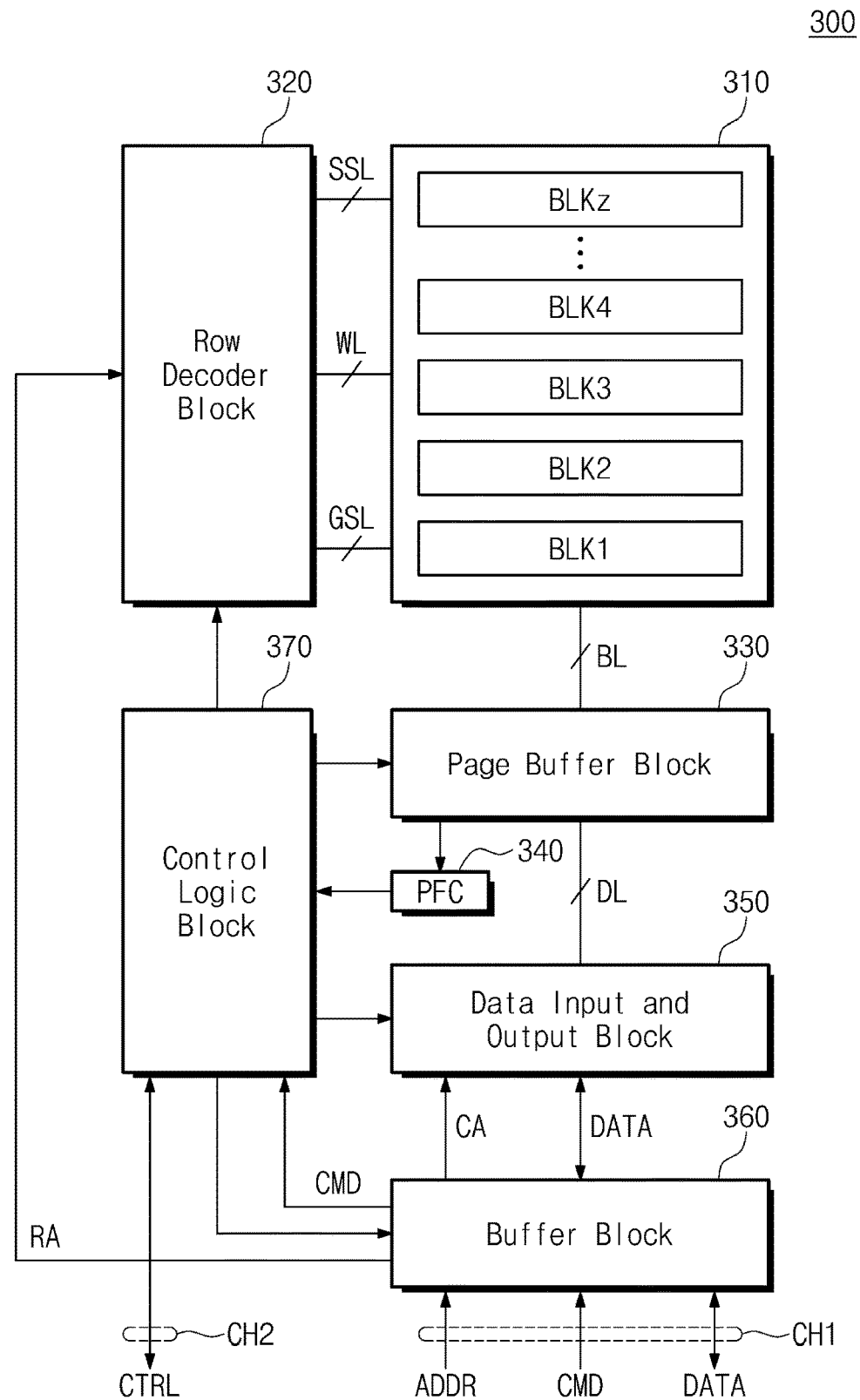
FIG. 11 is a block diagram illustrating a nonvolatile memory device according to an embodiment of the present disclosure.

FIG. 11 is a block diagram illustrating a nonvolatile memory device 300 according to an embodiment of the present disclosure. In an embodiment, the nonvolatile memory device 300 may include the nonvolatile memory device 110 described with reference to FIGS. 1 to 9.

Referring to FIG. 11, the nonvolatile memory device 300 includes a memory cell array 310, a row decoder block 320, a page buffer block 330, a pass/fail check block (PFC) 340, a data input and output block 350, a buffer block 360, and a control logic block 370.

The memory cell array 310 includes a plurality of memory blocks BLK1 to BLKz. Each of the memory blocks BLK1 to BLKz includes a plurality of memory cells. Each of the memory blocks BLK1 to BLKz may be connected with the row decoder block 320 through ground selection lines GSL, word lines WL, and string selection lines SSL. Some of the word lines WL may be used as dummy word lines. Each of the memory blocks BLK1 to BLKz may be connected with the page buffer block 330 through a plurality of bit lines BL. The plurality of memory blocks BLK1 to BLKz may be connected in common with a plurality of bit lines BL.

In an embodiment, each of the plurality of memory blocks BLK1 to BLKz may be a unit of an erase operation. The memory cells belonging to each of the memory blocks BLK1 to BLKz may be erased at the same time. For another example, each of the plurality of memory blocks BLK1 to BLKz may be divided into a plurality of sub-blocks. Each of the plurality of sub-blocks may correspond to a unit of an erase operation.

The row decoder block 320 is connected with the memory cell array 310 through the ground selection lines GSL, the word lines WL, and the string selection lines SSL. The row decoder block 320 operates under control of the control logic block 370.

The row decoder block 320 may decode a row address RA received from the buffer block 360 and may control voltages to be applied to the string selection lines SSL, the word lines WL, and the ground selection lines GSL based on the decoded row address.

Memory cells connected with one word line may be simultaneously programmed or and may be simultaneously read. Memory cells connected with one word line may form one page (e.g., a physical page). For example, a unit by which read and write operations of the nonvolatile memory device 300 are performed may correspond to a page.

Each memory cell may store two or more bits. Two or more bits may correspond to different logical pages, respectively. For example, one page (e.g., a physical page) connected with one word line may include two or more logical pages. Logical pages may be simultaneously written and may be read simultaneously or independently of each other.

The page buffer block 330 is connected with the memory cell array 310 through the plurality of bit lines BL. The page buffer block 330 is connected with the data input and output block 350 through a plurality of data lines DL. The page buffer block 330 operates under control of the control logic block 370.

In a program operation, the page buffer block 330 may store data to be written in memory cells. The page buffer block 330 may apply voltages to the plurality of bit lines BL based on the stored data. In a read operation or in a verify read operation that may be performed in the program operation or an erase operation, the page buffer block 330 may sense voltages of the bit lines BL and may store a sensing result.

In the verify read operation associated with the program operation or the erase operation, the pass/fail check block 340 may verify the sensing result of the page buffer block 330. For example, in the verify read operation associated with the program operation, the pass/fail check block 340 may count the number of values (e.g., the number of 0s) respectively corresponding to on-cells that are not programmed to a target threshold voltage or more.

In the verify read operation associated with the erase operation, the pass/fail check block 340 may count the number of values (e.g., the number of 1s) respectively corresponding to off-cells that are not erased to a target threshold voltage or less. When a counting result is a threshold value or more, the pass/fail check block 340 may output a fail signal to the control logic block 370. When the counting result is smaller than the threshold value, the pass/fail check block 340 may output a pass signal to the control logic block 370. Depending on a verification result of the pass/fail check block 340, a program loop of the program operation may be further performed, or an erase loop of the erase operation may be further performed.

The data input and output block 350 is connected with the page buffer block 330 through the plurality of data lines DL. The data input and output block 350 may receive a column address CA from the buffer block 360. The data input and output block 350 may output data read by the page buffer block 330 to the buffer block 360 depending on the column address CA. The data input and output block 350 may provide data received from the buffer block 360 to the page buffer block 330, based on the column address CA.

The buffer block 360 may receive a command CMD and an address ADDR from an external device through a first channel CH1 and may exchange data "DATA" with the external device. The buffer block 360 may operate under control of the control logic block 370. The buffer block 360 may provide the command CMD to the control logic block 370. The buffer block 360 may provide the row address RA of the address ADDR to the row decoder block 320 and may provide the column address CA of the address ADDR to the data input and output block 350. The buffer block 360 may exchange the data "DATA" with the data input and output block 350.

The control logic block 370 may exchange control signals CTRL with the external device through a second channel CH2. The control logic block 370 may provide the ability for the buffer block 360 to route the command CMD, the address ADDR, and the data "DATA". The control logic block 370 may decode the command CMD received from the buffer block 360 and may control the nonvolatile memory device 300 based on the decoded command.

In an embodiment, the nonvolatile memory device 300 may be manufactured in a bonding manner. The memory cell array 310 may be manufactured at a first wafer, and the row decoder block 320, the page buffer block 330, the data input and output block 350, the buffer block 360, and the control logic block 370 may be manufactured at a second wafer. The nonvolatile memory device 300 may be implemented by coupling the first wafer and the second wafer such that an upper surface of the first wafer and an upper surface of the second wafer face each other.

For another example, the nonvolatile memory device 300 may be manufactured in a cell over peri (COP) manner. The peripheral circuit including the row decoder block 320, the page buffer block 330, the data input and output block 350, the buffer block 360, and the control logic block 370 may be implemented on a substrate. The memory cell array 310 may be implemented over the peripheral circuit. The peripheral circuit and the memory cell array 310 may be connected by using through vias.

Figure 12:
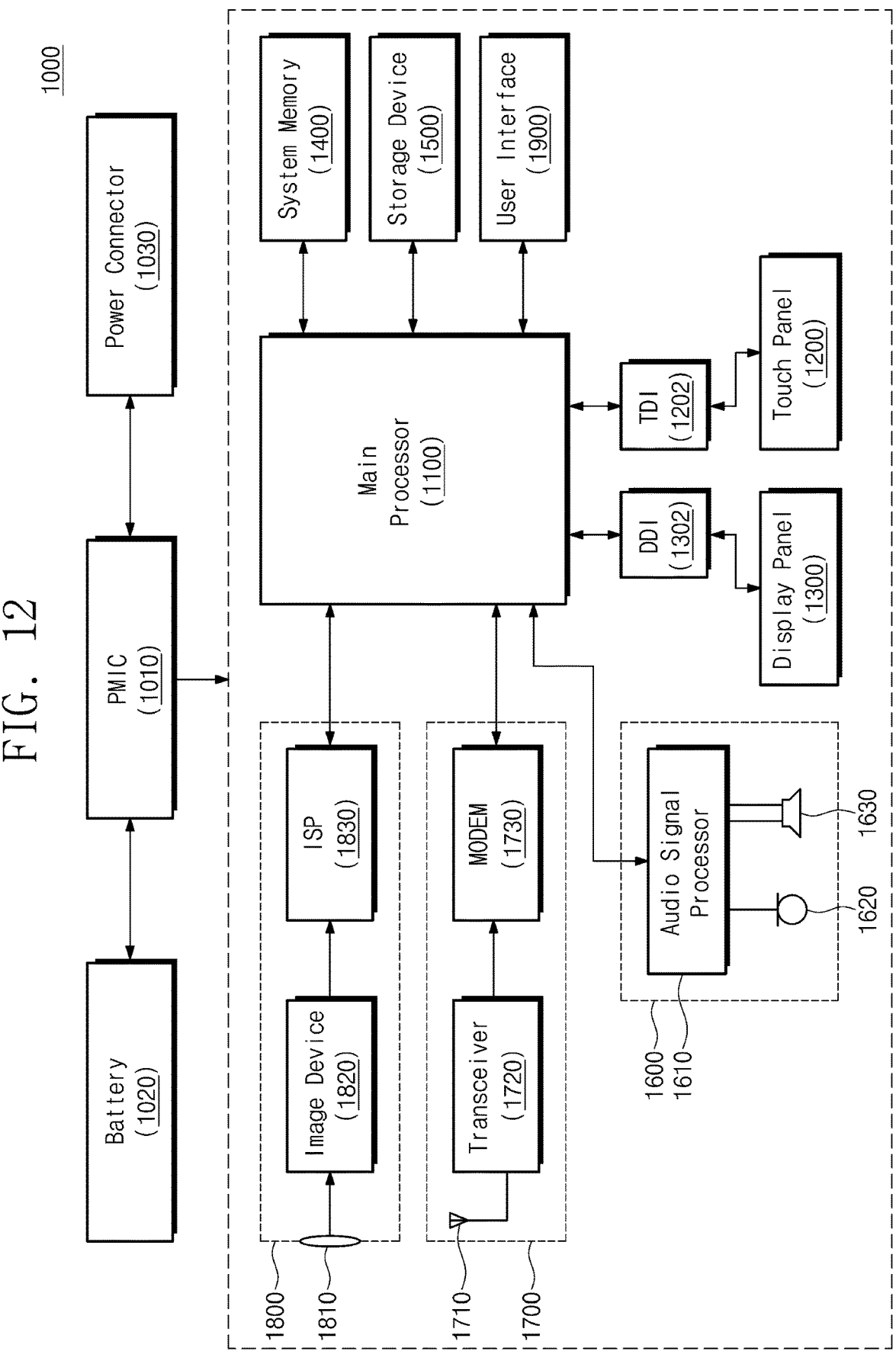
FIG. 12 illustrates an example of an electronic device according to an embodiment of the present disclosure.

FIG. 12 illustrates an example of an electronic device 1000 according to an embodiment of the present disclosure. Referring to FIG. 12, the electronic device 1000 may include a main processor 1100, a touch panel 1200, a touch driver integrated circuit (TDI) 1202, a display panel 1300, a display driver integrated circuit (DDI) 1302, a system memory 1400, a storage device 1500, an audio processor 1600, a communication block 1700, an image processor 1800, and a user interface 1900. In an embodiment, the electronic device 1000 may be one of various electronic devices such as a personal computer, a laptop computer, a server, a workstation, a portable communication terminal, a personal digital assistant (PDA), a portable media player (PMP), a digital camera, a smartphone, a tablet computer, and a wearable device.

The main processor 1100 may control overall operations of the electronic device 1000. The main processor 1100 may control/manage operations of the components of the electronic device 1000. The main processor 1100 may process various operations to operate the electronic device 1000. The touch panel 1200 may be configured to sense a touch input from a user under control of the touch driver integrated circuit 1202. The display panel 1300 may be configured to display image information under control of the display driver integrated circuit 1302.

The system memory 1400 may store data to be used in an operation of the electronic device 1000. For example, the system memory 1400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage device 1500 may store data regardless of whether a power is supplied. For example, the storage device 1500 may include at least one of various nonvolatile memories such as a flash memory, a PRAM, an MRAM, a ReRAM, and a FRAM. For example, the storage device 1500 may include an embedded memory of the electronic device 1000 and/or a removable memory.

In an embodiment, the storage device 1500 may include the storage device 100 described with reference to FIGS. 1 to 9. The storage device 1500 may generate a plurality of keys during an initialization time interval and may perform encryption or decryption while sequentially selecting the plurality of keys. For example, in response to an event where a cypher text stealing CTS occurs, the storage device 1500 may select a next key.

The audio processor 1600 may process an audio signal by using an audio signal processor 1610. The audio processor 1600 may receive an audio input through a microphone 1620 or may provide an audio output through a speaker 1630. The communication block 1700 may exchange signals with an external device/system through an antenna 1710. A transceiver 1720 and a modulator/demodulator (MODEM) 1730 of the communication block 1700 may process signals exchanged with the external device/system, based on at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID).

The image processor 1800 may receive a light through a lens 1810. An image device 1820 and an image signal processor (ISP) 1830 included in the image processor 1800 may generate image information about an external object based on received light. The user interface 1900 may include an interface capable of exchange information with a user, except for the touch panel 1200, the display panel 1300, the audio processor 1600, and the image processor 1800. The user interface 1900 may include a keyboard, a mouse, a printer, a projector, various sensors, a human body communication device, etc.

The electronic device 1000 may further include a power management integrated circuit (PMIC) 1010, a battery 1020, and a power connector 1030. The power management IC 1010 may generate an internal power from a power supplied from the battery 1020 or a power supplied from the power connector 1030, and may provide the internal power to the main processor 1100, the touch panel 1200, the touch driver integrated circuit (TDI) 1202, the display panel 1300, the display driver integrated circuit (DDI) 1302, the system memory 1400, the storage device 1500, the audio processor 1600, the communication block 1700, the image processor 1800, and the user interface 1900.

In an embodiment, each of various components included in the electronic device 1000, as well as the storage device 1500, may include an encryption and decryption unit. Each of the encryption and decryption units respectively included in the components may be configured as described with reference to FIGS. 1 to 9. For example, each of the encryption and decryption units may generate a plurality of keys during an initialization time interval and may perform encryption or decryption while sequentially selecting the plurality of keys. For example, in response to that the cypher text stealing CTS occurs, each of the encryption and decryption units may select a next key.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to embodiments of the present disclosure are referenced by using blocks. The blocks may be implemented with various hardware devices, such as an integrated circuit, an application specific integrated circuit (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to the present disclosure, a storage device may perform a plurality of encryption or decryption based on one initialization. Because the number of times that initialization is performed is reduced, a storage device performing encryption or decryption with an improved speed and an operating method of the storage device are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A storage device comprising:
   a memory device; and
   a memory controller configured to control the memory device,
   wherein the memory controller includes a plurality of encryption and decryption cores,
   wherein the plurality of encryption and decryption cores is configured to receive one or more initial vectors, one or more first keys and a second key different from the one or more first keys,
   wherein each initial vector includes a value associated with data targeted for encryption or decryption,
   wherein the plurality of encryption and decryption cores is configured to perform initialization in parallel, and to generate a plurality of initial tweak values, respectively, based on the one or more first keys and the one or more initial vectors,
   wherein the plurality of encryption and decryption cores is configured to sequentially select the plurality of initial tweak values to perform an encryption operation comprising encryption or decryption using an encryption key, and
   wherein the plurality of encryption and decryption cores is configured to perform the encryption operation using a respective initial tweak value selected from the plurality of initial tweak values and using the second key as the encryption key.

2. The storage device of claim 1, wherein each of the encryption and decryption cores is configured to receive an initial vector and to generate a corresponding initial tweak value of the plurality of initial tweak values by performing the initialization based on the one or more first keys and the initial vector.

3. The storage device of claim 1, wherein the plurality of encryption and decryption cores each receives a different key of the one or more first keys.

4. The storage device of claim 1, wherein encryption or decryption is performed based on cypher text stealing (CTS), and
wherein the plurality of encryption and decryption cores are configured to select a next initial tweak value of the plurality of initial tweak values based on the length of the plaintext data after each encryption or decryption.

5. The storage device of claim 1, wherein data targeted for the encryption operation is divided into segments,
wherein each initial vector includes a data physical address or data logical address indicating the data targeted for encryption or decryption, a key of a key-value store indicating the data targeted for encryption or decryption, or a hash value of the data targeted for encryption or decryption, and
wherein the plurality of encryption and decryption cores are configured to perform the encryption operation on the segments, wherein the encryption or decryption of each segment is based on an initial tweak value selected from the plurality of initial tweak values.

6. The storage device of claim 5, wherein the plurality of encryption and decryption cores are configured to sequentially start the encryption operation on the segments, and
wherein each of the plurality of encryption and decryption cores is configured to start the encryption operation based on a result of revising an initial tweak value used by the encryption and decryption core which immediately previously started the encryption operation.

7. The storage device of claim 5, wherein, when a size of a remaining portion of the data, on which the encryption operation is not performed, is smaller than a size of each of the segments after one encryption and decryption core of the plurality of encryption and decryption cores performs the encryption operation, the one encryption and decryption core performs cypher text stealing (CTS).

8. The storage device of claim 7, wherein the cypher text stealing includes:
combining the remaining portion of the data with partial data of result data of the encryption operation to generate combination data having the size of each of the segments; and
performing, at the one encryption and decryption core, the encryption operation on the combination data.

9. The storage device of claim 1, wherein the memory controller further includes a plurality of registers, and
wherein the plurality of encryption and decryption cores is configured to store the plurality of initial tweak values in the plurality of registers, respectively.

10. The storage device of claim 9, wherein, when one initial tweak value is selected from the plurality of initial tweak values, the plurality of encryption and decryption cores read the selected initial tweak value from a register, in which the selected initial tweak value is stored, from among the plurality of registers.

11. The storage device of claim 10, wherein the register is initialized after the plurality of encryption and decryption cores read the selected initial tweak value from the register.

12. The storage device of claim 1, wherein, after sequentially selecting the plurality of initial tweak values to perform the encryption operation, the plurality of encryption and decryption cores is configured to perform a second initialization to respectively generate a plurality of second initial tweak values, and
wherein the plurality of encryption and decryption cores is configured to sequentially select the plurality of second initial tweak values to perform the encryption operation.

13. An operating method of a storage device which includes a memory device and a plurality of encryption cores, the method comprising:
receiving a write request and an address and write data associated with the write request;
initializing the plurality of encryption cores to receive one or more initial vectors, receive one or more first keys, and generate a plurality of initial tweak values based on by encrypting the one or more initial vectors with the one or more first keys;
sequentially selecting the plurality of initial tweak values and encrypting the write data based on selected initial tweak values using the plurality of encryption cores and using an encryption key, wherein the encryption key is a second key different from the one or more first keys; and
transmitting the encrypted write data to the memory device.

14. The method of claim 13, wherein the encrypting of the write data includes:
dividing the write data into sectors based on logical block addresses; and
sequentially selecting the plurality of initial tweak values and sequentially encrypting the sectors by using the plurality of encryption cores.

15. The method of claim 14, wherein the encrypting of the sectors sequentially includes:
dividing each of the sectors into segments; and
encrypting the segments in parallel by using the plurality of encryption cores, based on an initial tweak value selected from the plurality of initial tweak values.

16. The method of claim 15, wherein, when a size of a segment, which is to be finally encrypted, from among the segments is smaller than a size of a previously encrypted segment, the plurality of encryption cores select a next initial tweak value of the plurality of initial tweak values after encryption of the segment to be finally encrypted is performed.

17. The method of claim 16, wherein a time interval where the encryption of the segment to be finally encrypted is performed and a time interval where encryption using the next initial tweak value is performed at least partially overlap each other.

18. An operating method of a storage device which includes a memory device and a plurality of decryption cores, the method comprising:
receiving a read request and an address;
initializing the plurality of decryption cores to receive one or more initial vectors, receive one or more first keys, and generate a plurality of initial tweak values by encrypting the one or more initial vectors with the one or more first keys;
dividing read data read from the memory device into sectors based on logical block addresses; and
sequentially selecting the plurality of initial tweak values and decrypting each of the sectors based on selected initial tweak values using the plurality of decryption cores and using an encryption key, wherein the encryption key is a second key different from the one or more first keys.

19. The method of claim 18, wherein the decryption is based on cypher text stealing (CTS).

20. The method of claim 19, wherein, after the decryption is performed based on the cypher text stealing (CTS), the plurality of decryption cores select a next initial tweak value of the plurality of initial tweak values.

* * * * *